April 9, 1940.   A. BEHR   2,196,601
TENNIS COURT MARKING
Filed Nov. 10, 1938
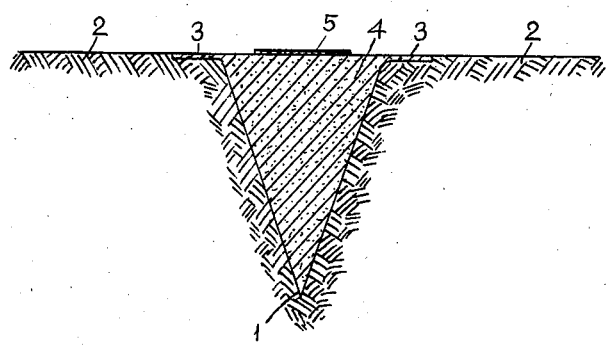
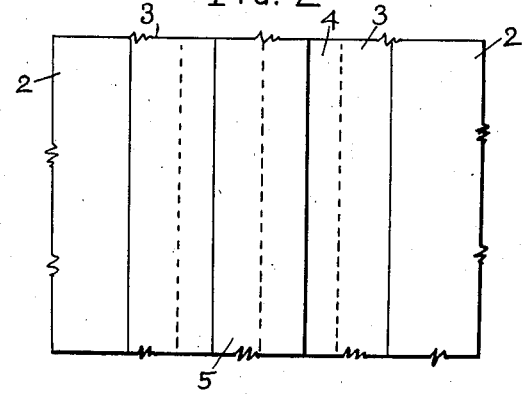
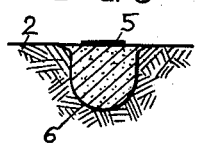
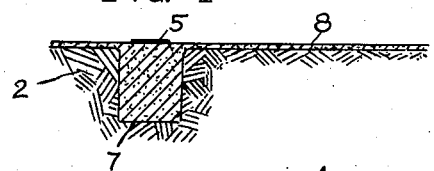
ALLEN BEHR
INVENTOR.
BY John P. Nikonov
ATTORNEY.

Patented Apr. 9, 1940

2,196,601

UNITED STATES PATENT OFFICE 2,196,601

TENNIS COURT MARKING

Allen Behr, New York, N. Y.

Application November 10, 1938, Serial No. 239,803

2 Claims. (Cl. 94—1.5)

My invention relates to tennis court marking and has particular reference to the marking of white lines on tennis courts or similar courts where games are played.

Tennis courts must have clearly visible white lines, which, however, rapidly wear out or become rubbed out or washed away by rain, and must be frequently renewed, such renewal being necessary every day if the courts are often used and it is desired to keep them in good condition. To overcome this difficulty, several types of so-called permanent marking have been introduced, all of which, however, have certain defects and undesirable properties. Such permanent marking usually consists of a tape made of strong white fabric nailed to the surface of the court, or of metal strips or channel bars fastened to the surface or even partly imbedded if such strips have suitable flanges. The main difficulty with such marking is that they represent a certain hazard in play, forming obstructions and catching the players' feet, especially when the earth around or under the tapes or strips becomes partly worn out.

My invention has for its object therefore to provide a marking which will remain for a long time in good condition, usually for the whole season, and will not be readily worn out or washed away by rain. I accomplish this purpose by providing a special foundation for the marking in the form of slabs of a cementitious composition, imbedded in deep grooves in the court, the marking being painted on the surface of the slabs in white oil paint which is waterproof and resists ordinary wear.

My invention is more fully described in the accompanying specification and drawing in which—

Fig. 1 is a sectional view of a portion of a tennis court showing my marking.

Fig. 2 is a top plan view of the same.

Figs. 3 and 4 are sectional views of a modified form of marking.

A tennis court is prepared for my marking by plowing relatively deep grooves 1, preferably wedge-shaped or V-shaped as shown in the upper layer 2 of the court which is usually made of clay or a mixture of clay with sand. The depth of the groove usually reaches two or three inches. The grooves are filled by pouring into them a special composition prepared as follows: two parts by weight of ordinary masons' lime is mixed with one part of Portland cement or other suitable self-hardening cement, preferably of the type used in the building industry. Three parts of sand is added to the resultant mixture and enough water is added to obtain a slowly flowing thick mixture which is poured into the grooves to overflowing. The mass is smoothed down on top with a trowel flush with the surface of the court 2, allowing some of the material to spread out at the sides 3. The resultant slabs 4 form a foundation for lines 5 applied with an ordinary oil paint or other paint, preferably of an indelible type impervious to water. The slabs must be thoroughly dry before the paint is applied.

The grooves may be made of any suitable shape such as rounded as shown at 6 in Fig. 3 or rectangular as shown at 7 in Fig. 4. The composition may be spread out over the whole court in a thin layer 8, materially strengthening the surface and rendering it rain-resistant. A beneficial effect is also obtained if the composition is merely sprayed over the court. The color of the composition closely approaches the color of an ordinary clay court. For court surfaces with red or green sand, the mixture may be prepared with a correspondingly colored sand or suitable granular material.

I have experimented with various proportions of lime and cement and found that the best results are obtained when there is about twice as much lime as there is cement. It appears that lime sufficiently separates the cement particles so that the latter cannot unite into a solid hard block but form a porous pliable skeleton rendered slightly plastic by the addition of hygroscopic lime. The resultant slab has approximately the same hardness as the rest of the court which is usually made of clay with a small addition of sand. I prefer to make slabs in the form of more or less sharp wedges 1 which can be forced deeper into the surface of the court when the latter is rolled so that the surface of the slab can be maintained flush with the surface of the rest of the court.

The slab when prepared as indicated above does not become brittle and does not crumble in dry weather, retaining a certain degree of elasticity. It is affected very little by the rain, especially if its surface has been thoroughly rubbed with a trowel when first poured in. It appears that the surface under such treatment acquires a firm, practically impervious layer, protecting the rest of the slab. The slab under such conditions lasts for the whole season of play and may only occasionally require slight repairs as, for instance, after heavy rains, the repairs being made by the addition of a freshly prepared composition and troweling it on top. In the spring, when the court is being prepared for the season, the slab which may have been damaged by frost during the winter, is softened with water and more composition is added for filling holes and cracks.

My composition has an important advantage that it firmly adheres to sand and clay of which the court is made so that the slab remains securely in its groove and cannot be washed out by rain, nor does it crack away during dry weather.

I have also found that very good results are obtained when ordinary ashes from coal furnaces are added to my mixture. The mixture when applied to the surface of the court must be trowled or scraped smooth, pressing down larger pieces and spreading the softer or more liquid composition over the top. Ashes are usually considerably cheaper than sand and they unite well with cement and lime, substantially strengthening the resultant layer or slab. Ashes may fully replace the sand although I prefer to add ashes to the sand. A good mixture is obtained when one part by weight of ashes is added to two parts of sand, adding it to two parts of the cement-lime mixture.

I claim as my invention:

1. A tennis court marking consisting of a continuous slab of a uniform cross-section placed in a corresponding groove in the surface portion of a tennis court, the slab being formed of a cementitious material containing an excess of lime so as to render the dried slab slightly softenable with water, the upper edge portions of the slab being expanded in relatively thin flange-like portions adapted to form a smooth transition between the body of the slab and the surface of the court under different atmospheric conditions, the middle portion of the slab being covered with a paint impervious to water.

2. A tennis court marking consisting of a continuous slab of a uniform cross-section placed in a corresponding groove in the surface portion of a tennis court, the slab being formed of a cementitious material containing an excess of lime so as to render the dried slab slightly softenable with water, the middle portion of the slab being covered with a paint impervious to water, the exposed marginal portions of the slab being merged with the surface of the court.

ALLEN BEHR.